(12) United States Patent
Ohkawa

(10) Patent No.: US 6,755,546 B2
(45) Date of Patent: Jun. 29, 2004

(54) LIGHT GUIDE PLATE, SURFACE LIGHT SOURCE DEVICE AND DISPLAY

(75) Inventor: Shingo Ohkawa, Koshigaya (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 09/916,279

(22) Filed: Jul. 30, 2001

(65) Prior Publication Data

US 2002/0030984 A1 Mar. 14, 2002

(30) Foreign Application Priority Data

Aug. 1, 2000 (JP) ........................................ 2000-232554

(51) Int. Cl.$^7$ ............................................... F21V 8/00
(52) U.S. Cl. ............................. 362/31; 362/26; 362/27; 362/330; 362/560; 362/561
(58) Field of Search ........................ 362/31, 560, 561, 362/327, 330, 339, 26, 27

(56) References Cited

U.S. PATENT DOCUMENTS

| | | | | |
|---|---|---|---|---|
| 6,036,340 A | * | 3/2000 | Fohl et al. | 362/511 |
| 6,402,335 B1 | * | 6/2002 | Kalantar et al. | 362/31 |
| 6,609,809 B2 | * | 8/2003 | Ohkawa | 362/31 |
| 6,616,290 B2 | * | 9/2003 | Ohkawa | 362/31 |
| 6,671,013 B1 | * | 12/2003 | Ohkawa | 349/62 |
| 6,676,268 B2 | * | 1/2004 | Ohkawa | 362/31 |

* cited by examiner

Primary Examiner—Sandra O'Shea
Assistant Examiner—Anabel Ton
(74) Attorney, Agent, or Firm—Staas & Halsey LLP (57) ABSTRACT

A surface light source device comprises a light guide plate having an emission face and, opposite with the emission face, a back face which is provided with a great number of micro-reflectors, for example, shaped like pyramids and a fine-unevenness surface is formed among the micro-reflectors. The light guide plate has an incidence face through which an illumination light is introduced into the light guide plate to be then being emitted from the emission face with the help of the micro-reflectors and the fine-unevenness surface. Each micro-reflector has at least a pair of slopes which meet each other as to form a ridge that gets closer with an increasing distance from the incidence face. A large part of an inner propagation light is inner-reflected twice by the slopes successively and direction-converted as to be directed to the emission face. The fine-unevenness surface formed among the micro-reflectors has a characteristic adjusting function that additionally adjusts characteristics such as uniformity of brightness which would be insufficient if otherwise only micro-reflectors are formed. The illumination light emitted from the emission face is supplied to an object such as a liquid crystal display panel.

6 Claims, 6 Drawing Sheets

Fig. 6

LIGHT GUIDE PLATE, SURFACE LIGHT SOURCE DEVICE AND DISPLAY

BACKGROUND

1. Field of Invention

The present invention relates to a light guide plate emitting light from an emission face after applying direction-conversion within the light guide plate to light applied thereto sideways, and to a surface light source device and display employing the light guide plate.

2. Related Art

A well-known technique gives a surface light source device that employs a light guide plate having an incidence end face provided by a side end face and an emission face provided by one of two major faces (i.e. faces larger than end faces), wherein light is introduced into the light guide plate through incidence end face, the surface light source device being applied to various uses such as back-lighting for a liquid crystal display. A surface light source device of such a type has a basic performance greatly depending on a light guide plates employed therein.

A basic function of a light guide plate is to change a propagation direction (roughly in parallel with an emission face of the light guide plate) of light introduced into the light guide plate through a side end face so that the light is emitted through the emission face. As known well, a simply transparent light guide plate without any modification is capable of deflecting light a little, providing a unsatisfactory brightness. Therefore any means for promoting emission through the emission face is required.

The present invention proposed a light guide plate provided with so-called micro-reflectors and surface light source device/LCD employing the light guide plate, being disclosed in PCT/JP00-00871 (WO00-49432).

Figure 6:
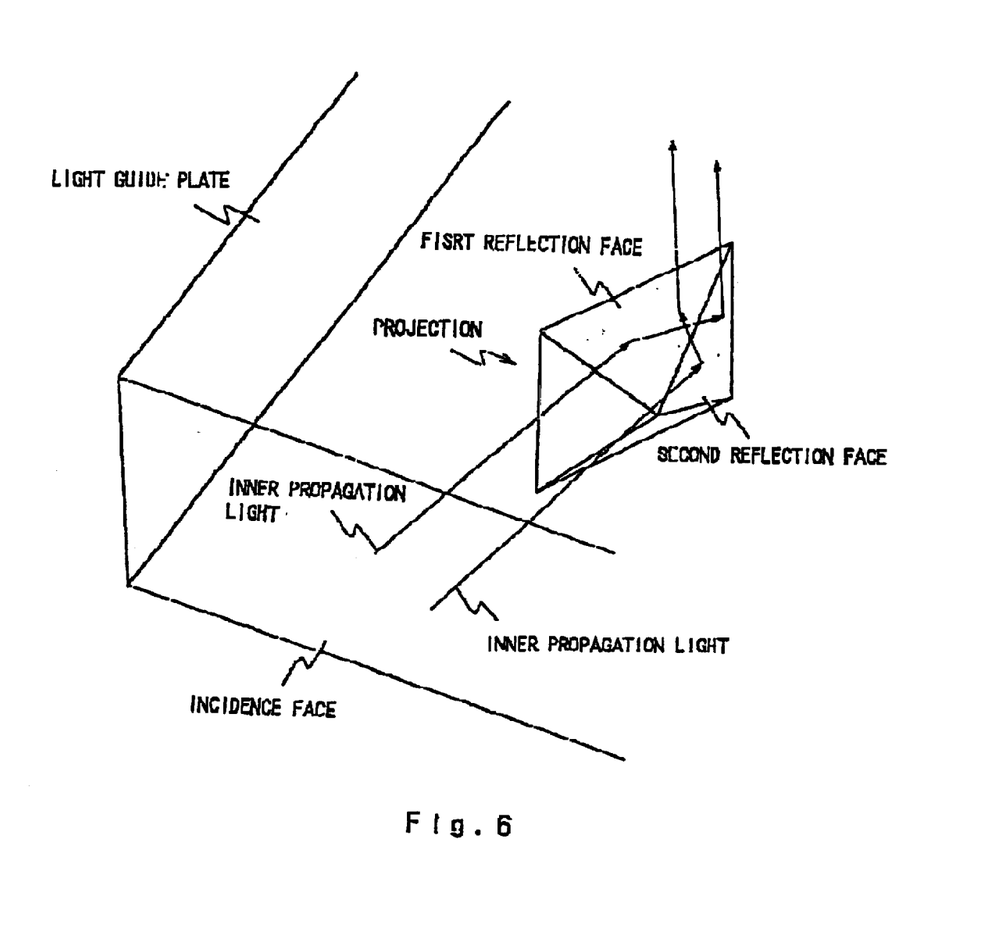

According to the this prior art, a light guide plate has a back face provided with a great number of micro-reflectors. FIG. 6 shows one of the micro-reflectors to illustrate an emission promotion function. As shown in FIG. 6, each micro-reflector has a first and second reflection surfaces which are a pair of inclined reflection surfaces to provide a valley inside. Upon reaching, a micro-reflector and entering into a valley thereof on the way of propagation within the light guide plate, light is direction-converted mainly by inner-reflections effected twice. This twice-reflected inner reflection consists of two inner reflections, one inner reflection being effected at one of the first and second reflection surfaces and the other inner reflection then being effected at the other of the first and second reflection surfaces.

This direction-conversion produces light directed to the emission face, promoting emission from the emission face. A propagation direction of light after being direction-converted by each micro-reflector mainly depends on the inclinations (i.e. spatial directions) of the first and second reflection surfaces of the micro-reflector. Therefore angular emission characteristics of the light guide plate as a whole can be controlled within a remarkable range ny means of adjusting factors such as direction distribution of reflection surfaces, or arraying pattern or distribution of the micro-reflectors.

According to typical designs, it is aimed that a light guide plate allows an emission face of the light guide plate to emit the most intensive light toward a generally frontal direction Employable primary light sources fro supplying light to the light guide plate include a line-like light source such as cold cathode lamp and point-like light source such as light emitting diode, both being usable for providing a surface light source device to have an improved brightness.

It is, however, not rare for a light guide plate or surface light source device provided with micro-reflectors as above-mentioned to be wanted to have further improved characteristics. For example, the followings are demanded.

(i) A micro-reflector intensively helps an emission to emit light toward a generally frontal direction However, some light is incident to a micro-reflector at a large inclination angle with respect to a ridge formed by a meeting of two slopes for effecting direction-conversion, hardly resulting in a promoted frontal emission because such obliquely incident light is converted into beams which is rather divergent regarding in a plane parallel to an incidence end face. Emission characteristics are wanted in some cases to be corrected for avoiding such situation.

(ii) Indeed a high emission directivity is obtained by relying upon direction conversion effected by micro-reflectors, but such a high emission directivity is undesirable in some cases because of being excessive. In other words, an unnaturally reduced brightness can be felt when a direction of viewing is slightly deviated from a particular direction (frontal direction, typically). Emission characteristics are wanted to be corrected in some cases for avoiding this.

(iii) A direction conversion effect relying upon micro-reflectors is apt to bring a fine brightness unevenness which appears depending on positions of the micro-reflector (presence/blank). Such a brightness unevenness gives a feeling of glaring. Emission characteristics are wanted to be corrected in some cases for avoiding this.

OBJECT AND SUMMARY OF INVENTION

The the present invention is proposed under the above-described background, aiming to provide an art that enables a light guide plate, surface light source device and display, which utilize micro reflectors, to have further adjusted characteristics.

In the first place, the present invention is applied to a light guide plate which has an emission face provided by a major face, a back face opposite with the emission face and an incidence face for introducing light.

According to a feature of the present invention, the back is provided with a great number of projection-like micro-reflectors and a fine-unevenness surface formed among the micro-reflectors. Each of the micro-reflectors has at least a pair of slopes which meet each other as to form a ridge that gets closer with an increasing distance from the incidence face.

This feature enables a light guide plate to output an illumination light with characteristics which include a good directivity indebted to the micro-reflectors and is further adjusted by the fine-unevenness surface. In a typical case, the micro-reflectors are shaped like quadrangle pyramids.

In the next place, the present invention is applied to a surface light source device which has a light guide plate having an emission face provided by a major face, a back face opposite with the emission face and an incidence face for introducing light, and a primary light source for supply light to the incidence face. The light guide plate is featured as above.

That is, the back is provided with a great number of projection-like micro-reflectors and a fine-unevenness surface formed among the micro-reflectors. Each of the micro-reflectors has at least a pair of slopes which meet each other as to form a ridge that gets closer with an increasing distance from the incidence face. In a typical case, the micro-reflectors are shaped like quadrangle pyramids.

The merits of the light guide plate are maintained in the surface light source device. In other words, Obtained is a surface light source device which is able to output an illumination light with characteristics which include a good directivity indebted to the micro-reflectors and is further adjusted by the fine-unevenness surface. A particular need for a member for direction-modifying the emission (for example, prism sheet) is cancelled.

The present invention is also applied to a display comprising a liquid crystal display panel and a surface light source device for illumination the liquid crystal display panel. The surface light source device is featured as above.

The merits of the surface light source device are maintained in the display. In other words, Obtained is a display which allows to look bright as viewed from a generally frontal direction because the liquid crystal display panel is effectively supplied with an illumination light with characteristics which include a good directivity indebted to the micro-reflectors and is further adjusted by the fine-unevenness surface.

EMBODIMENT

Figure 2:
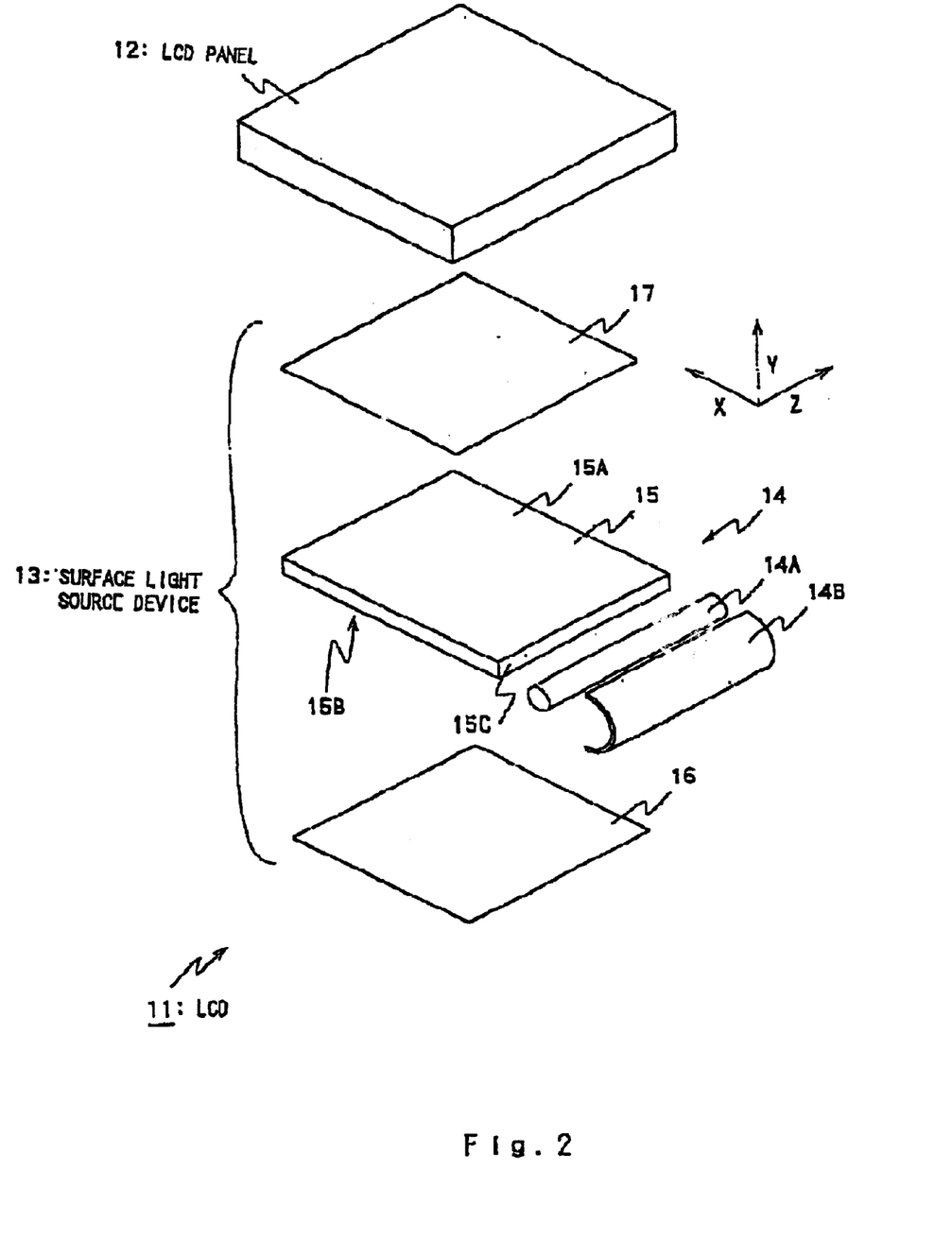
FIG. 2 is an exploded perspective view of the liquid crystal display to which the surface light source device employing the light guide plate shown in FIG. 1 is applied.

Embodiments in accordance with the present invention are described below in detail with referring to the drawings. It is noted that some parts are exaggerated as required for giving easy understanding in the drawings.
(1) First Embodiment FIG. 2 is an exploded perspective view of the liquid crystal display of the first embodiment. A liquid crystal display 11 applied, for example, to a personal computer, has a liquid crystal display panel 12 which illuminated from the back side by a surface light source device 13, providing an image.

The light source device 13 has a light guide plate 15 and a line-like fluorescent lamp 14A disposed along an incidence face 15C. The fluorescent lamp 14A is backed by a reflector 14B to provide a primary light source 14 compound of them 14A and 14B.

The light guide plate 15 have major faces which provide an emission face 15A and a back face 15B opposite with the emission face. In this embodiment, the back face 15B extends in parallel with the emission face 15A except micro reflectors described and fine-unevenness surface described later formed among the micro-reflectors.

A reflection sheet 16 and light diffusion sheet 17 are disposed along the back face 15B and the emission face 15A, respectively. The reflection sheet 16 made of a white sheet member reflects and returns a leaking light, which has gone of out from the back face 15B, into the light guide plate 15, thereby avoiding loss of illumination light. The light diffusion sheet 17 is made of a light permeable sheet which scatters weakly the illumination light omitted from the emission face 15A. Such a weak scattering makes fine elements such as micro-reflectors described later inconspicuous and also makes an abnormal emission, even if it is caused by flaws or the like in the light guide plate 15, inconspicuous.

Further to this, the light diffusion sheet 17 relaxes a fine unevenness in brightness, even if it appear on the emission face 15A, by means of the weak scattering effect. Saying from another standpoint, the light diffusing sheet 17 has a function of preventing the emission face 15 of the light guide plate 15 from being flawed.

The light guide plate 15 is an transparent injection-molded flat-plate-like member made of transparent material such as acrylic resin (PMMA resin) or cycloolefinic polymer.

Figure 3A:
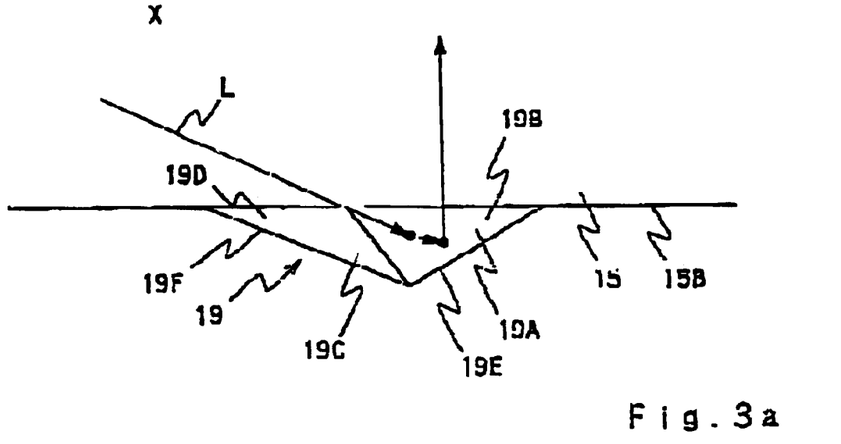
FIG. 3a and FIG. 3b are a side view and plan view of a micro-reflector formed on a back face of the light guide plate shown in FIG. 1, respectively.
Figure 3B:
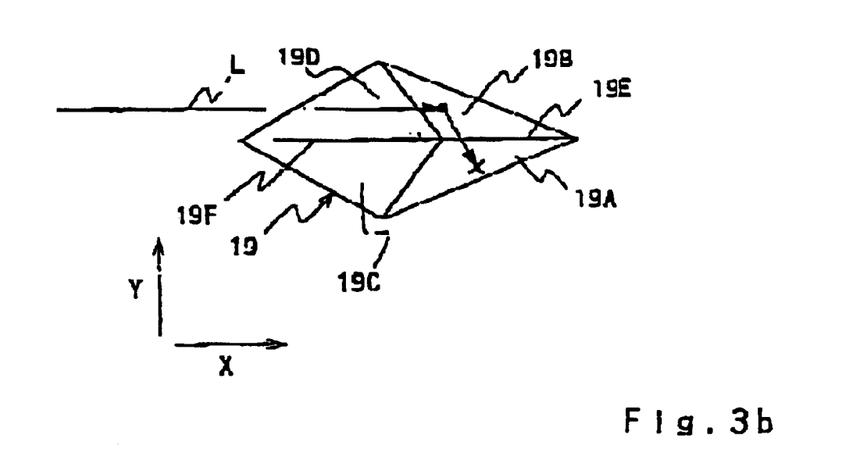

The emission face 15A and back face 15B are shaped like rectangles respectively, which provide the incidence face 15C at a shorter side. The emission face 15A provides a flat surface. On the other hand, the back face 15B is provided with a great number of projection-like micro-reflectors and a fine-unevenness surface extending among the micro-reflectors. A direction-conversion effect is illustrated in FIG. 3a and FIG. 3b which are a side view and backside plan view of a micro-reflector, respectively.

As understood from the illustrations, on inner-inputting into a micro-reflector 19, an illumination light L travelling within the light guide plate 15 is converted into an inner output light directed to a generally frontal direction with respect to the emission face 15A mainly through double reflections. This inner output light is outputted from the emission face 15A toward a generally frontal direction.

Seeing in details, the micro-reflector 19 has a pair of slopes 19A and 19B, and another pair of slopes 19C and 19D which are formed as to avoid the illumination light directed to the slopes 19A and 19B from being blocked. Geometrically, these four slopes 19A, 19B, 19C and 19D are connected directly to each other to form a shape like a quadrangle pyramid.

The slopes 19A and 19B are inclined as to meet each other and make a designed vertical angle. Besides, the slopes 19A and 19B provide a V-shaped valley getting shallower with an increasing distance from the incidence face 15C.

Thus the slopes 19A and 19B are formed face-symmetrically with respect to a plane which passes a ridge 19E and is perpendicular to the emission face 15A. The ridge 19E is inclined getting closer to the back face 15B with an increasing distance from the incidence face 15C, extending generally perpendicular to the incidence face 15C.

The other pair of slopes 19C and 19D are inclined, like the slopes 19A and 19B, as to meet each other and make a designed vertical angle to providing a ridge 19F corresponding to a meeting line. The slopes 19C and 19D provide a V shaped valley getting deeper with an increasing distance from the incidence face 15C. This valley is formed face-symmetrically with respect to a plane which passes the ridge 19F and is perpendicular to the emission face 15A. The ridge 19F is inclined getting more distant from the back face 15B with an increasing distance from the incidence face 15C, extending generally perpendicular to the incidence face 15C.

Such structure causes much of light that the illumination light L reaching the micro-reflector 19 via the incidence face 15C to have propagation directions which do not make large angles with extending directions of the ridges. Therefore much light is introduced smoothly in the valleys on both sides of the ridges 19F and 19E, surely leading to double and successive inner reflections by one and the other of the slopes 19A and 19B. As a result, an inner output light directed to the emission face 15A is produced, realizing an effective emission from the emission face 15 toward generally frontal directions thereof.

It is noted that some light is directed to the slope 19A or 19B after being inner-reflected by the slope 19C or 19D and is direction-converted in a similar manner. And formation density of the micro-reflectors 19 (covering rate; area covered by micro-reflectors per unit area) may be adjusted depending on position on the back face 15B so that a flat brightness distribution is obtained over the emission face 15A. Sizes of the micro-reflectors 19 are preferably designed as to be enough small to be hardly visible.

Further, micro-reflector arrangement is preferably designed as to have no strikingly periodic regularity in order to prevent an overlapping relation with other fine elements (such as LCD cells or wiring pattern) from generating Mire pattern.

In the next place, the fine-unevenness surface formed among the micro-reflectors 19 on the back face 15B are described as follows.

Figure 1:
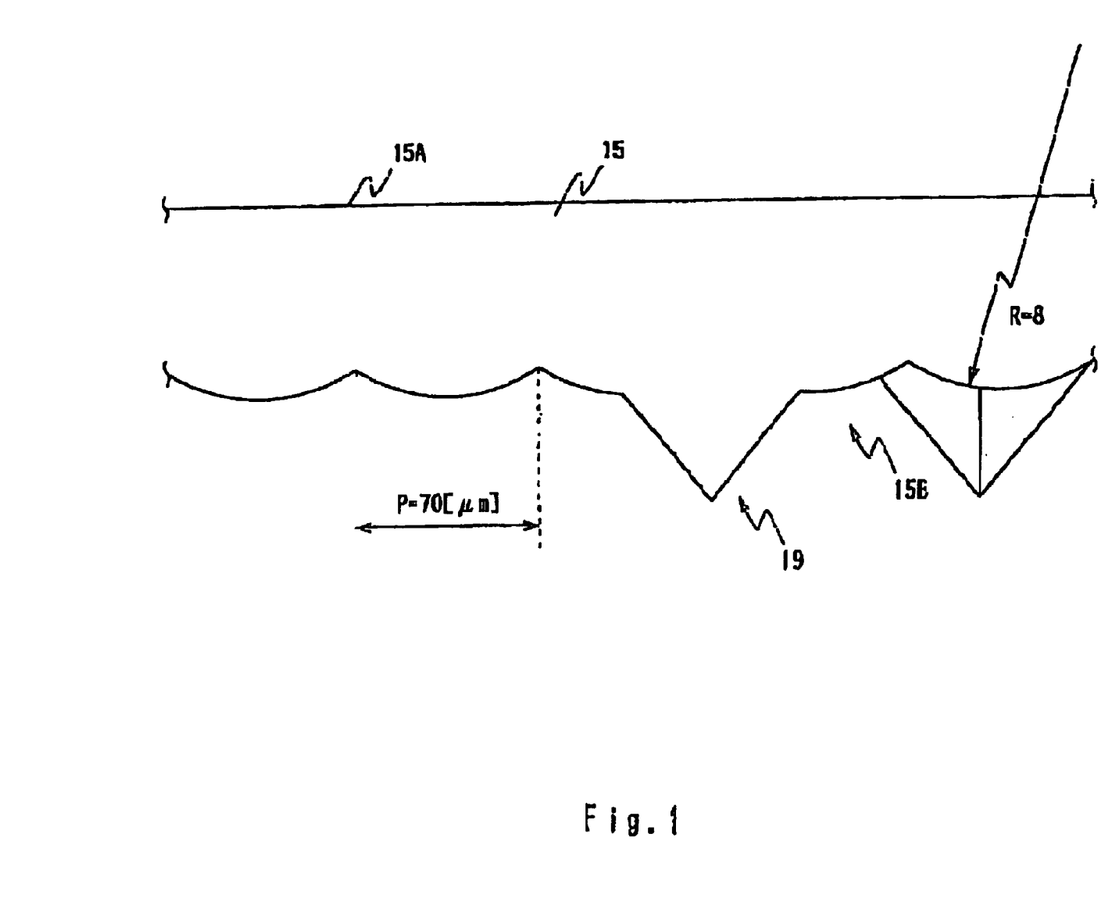
FIG. 1 is an enlarged cross section illustrating a light guide plate employed in a surface light source device applied to a liquid crystal display of a first embodiment in accordance with the present invention.
Figure 4:
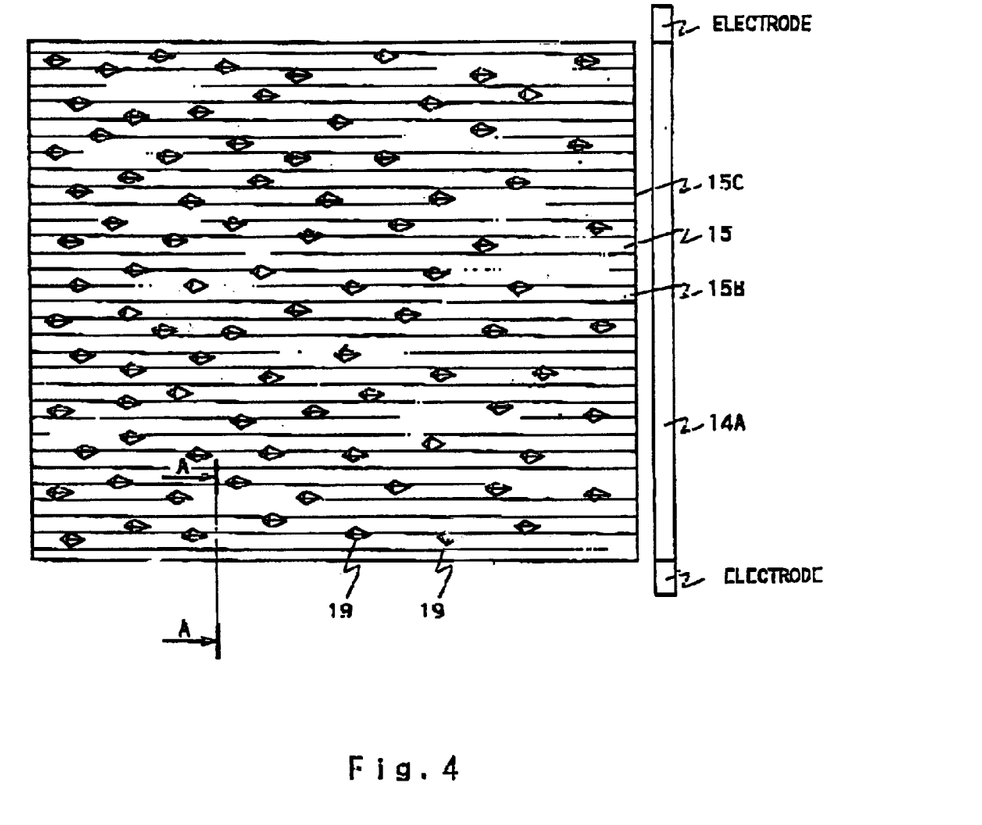
FIG. 4 is a plan view of the back face of the light guide plate shown in FIG. 1.

FIG. 4 illustrates the back face 15B of the light guide plate 15. It is noted that only a small number of micro-reflectors 19 are depicted with an exaggerated size for the sake of illustrating. FIG. 1 is an enlarged cross section of the light guide plate 15 along line A—A in FIG. 4.

Referring to these illustrations, the fine-evenness surface in this embodiment consists of a great number of straight-line like grooves extending in a direction generally perpendicular to the incidence face 15C. The grooves are provided by ridge-projections formed repeatedly with a designed repetition pitch P along a direction parallel to the incidence face 15C, each of the ridge-projections having an arc-like cross section with radius of curvature R.

It is noted that radius of curvature R is set as to be by far greater than repetition pitch P. In other words, each groove has a surface which provides a very gentle curvature without sharp cutting. According to a practical example set of values, radius of curvature R is 8 mm and repetition pitch P is 70 μm, as shown in the illustration.

On lightening of the primary light source 14 in the surface light source device 13 structured as above-described, an illumination light is introduce into the light guide plate 15 through the incidence face 15C, becoming an inner-propagation light. The inner-propagation light propagates, as a whole, as to get far from the incidence face 15C while being inner-reflected at the emission face 15A and back face 15B repeatedly. A remarkable part of the inner-propagation light encounters any micro-reflector 19 to be inputted to the micro reflector 19.

The above-mentioned effect (inner-reflections occurring generally twice) causes the inputted light to be light-path-bent and emitted from the emission face 15A toward a generally frontal direction.

Attention should be paid to a fact that inner-incidences to an area extending among the micro-reflectors 19 occur frequently on the way of the above process in addition to inner-input (inner incidences) to the micro-reflectors 19 as above-mentioned. This area is provided with the grooves each of which has a gently curved surface as above-mentioned. Inner-incidences to the area involves effects as follows.

The fine-unevenness surface (ridge-like projections) formed as described above brings an enforced emission toward a frontal direction regarding in a plane parallel with the incidence face 15C. In other words, the above-mentioned gently curved surface causes the inner-incident light thereto, which is greatly inclined toward the right or left viewing from the incidence face 15C, to direction-stand up regarding in a plane parallel with the incidence face 15C.

If otherwise a flat surface is formed without fine-unevenness among the micro-reflectors 19, such a direction-modifying effect cannot be expected.

Since this direction-modifying effect is effective all over the emission face 15B except the regions occupied by the micro-reflectors 19, after all, direction-modifications of the inner-propagation light are effected overall within the light guide plate 15. As a result, inner-incidences to micro-reflectors 19 tend to make reduced angles with respect to the extending directions of the ridges 19E.

Thus the fine-unevenness surface modifies emission characteristics as to be different from those provided under otherwise only the micro-reflectors 19. How or to what extent the emission characteristics are to be modified is controllable through adjusting factors such as configuration or sizes (for instance, radius of curvature R or pitch P) of the unevenness surface.

Another effect is that an increased amount of emission is expected over the emission face 15A since the fine-unevenness surface causes the inner-incident light thereto to have reduced inner incident angles at inner-incidences occurring next time to the emission face 15A. Besides, such emission occurs scarcely depending on positions of the micro reflectors 19 because of not relying upon only the micro-reflectors.

As a result, it is possible to obtain a reduced fine unevenness in brightness which appears depending on positions (presence/absence) of the micro-reflectors 19. Such a reduced fine unevenness in brightness brings an illumination light involving a reduced uncomfortable glaring. Thus this embodiment satisfies mainly demands (i) and (iii) mentioned above.

(2) Second Embodiment

Figure 5:
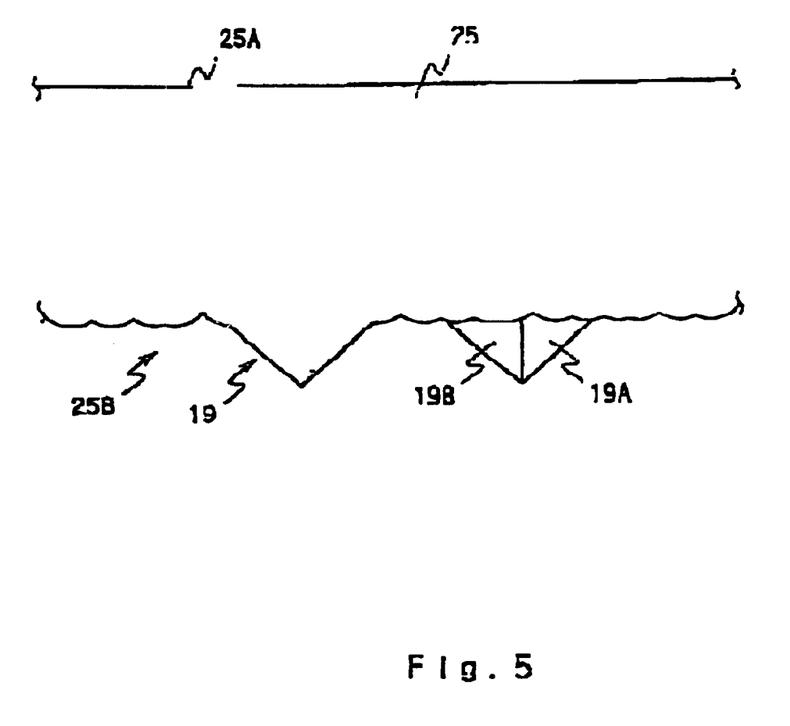
FIG. 5 is an enlarged cross section illustrating a light guide plate employed in a surface light source device applied to a liquid crystal display of a second embodiment in accordance with the present invention; and, FIG. 6 is a perspective view of a micro reflector in accordance with a prior proposed art.

FIG. 5 is an enlarged cross section illustrating a light guide plate employed in a surface light source device applied to a liquid crystal display of the second embodiment. This embodiment has the same structure as that of the first embodiment except the light guide plate 15 shown in FIGS. 1, 2 and 4 is replaced by a light guide plate 25.

That is, a fluorescent lamp (See FIG. 2) backed by a reflector is disposed along a side end face as a counterpart of the incidence face 15C of the light guide plate 15. The side end face provides an incidence face. FIG. 5 gives a cross section view along a plane parallel with the side end face. Referring to FIG. 5, the light guide plate 25 has a back face 25B which is provided with a great number of micro-reflectors 19 in a similar way be compared with the light guide plate 15 the first embodiment.

Each micro-reflector 19 may be not different from each of the micro-reflectors formed on the back face 15B of the light guide plate 15 in size and shape. Thus each micro-reflector 19 has the same shape and function as compared with those above-described with referring to FIG. 3. As for orientation, the micro-reflector 19 are directed so that their ridges 19E (See FIG. 3) extend in directions which are generally perpendicular to the incidence face of the light guide plate 25.

An area extending among the micro-reflectors 19 has a surface configuration which is different from that of the light guide plate 15 (the first embodiment). That is, the area extending among the micro-reflectors 19 is provided with a fine-unevenness surface having dome-like or granulated configurations as shown in FIG. 5.

In other words, a kind of roughened surface region is formed among the micro-reflectors 19. The surface has a roughness degree of which is set so that no glaring is observed through the emission face 25A. A practical range is, for example, from about 0.02 μm to about 3.0 μm in arithmetic average mean roughness Ra.

Each dome-like or granulated element has a size about, for example, 20 μm. An excessively large size would bring a deteriorated visual feeling. It is noted that arithmetic average mean roughness Ra is a unit defined in JIS-B06011994.

If the fine-unevenness surface has any periodic component, Moire stripe can be produced due to an overlapping relation between the periodic component and other fine elements (for example, fine-structured liquid crystal cells). Therefore, the fine-unevenness surface is preferably provided with irregularity.

A fine unevenness surface as above can be manufactured, for example, by getting an inner surface of a mold used for molding light guide plate or outer surface of a light guide plate hit by fine glass beads by means of a high-speed air jet.

Some scattering light is produced among the micro-reflectors 19 since the fine-unevenness surface (rough surface) is formed as above-described. This scattering light is emitted at all portions on the emission face 25A via various travelling paths. And such emission is provided toward various directions. Accordingly, as a whole, a weak emission directivity due to the fine unevenness surface is additionally overlapped on a strong directivity to a generally frontal direction due to the micro-reflectors 19.

In other words, this embodiment causes basic characteristic provided by the former to be modified by the latter. Thus this embodiment satisfies mainly demands (ii) and (iii) mentioned above.

If otherwise a flat surface is formed without fine-unevenness among the micro-reflectors 19, such a direction-modifying effect cannot be expected. It should be noted that degree of direction-modifying and others can be controlled through adjusting roughness of the fine-unevenness or the like.

(3) Modifications

The above-described embodiments do not limit the scope of the present invention at all. For example, the following modifications are allowed without deviating from the scope of the present invention (a) If a fine-unevenness surface consisting of a great number of ridge-like projections formed among micro-reflectors is employed, the ridge-like projections may extend in a direction otter than directions (as in the first embodiment) generally perpendicular to the incidence face. The ridge-like projections may have various extending directions as required for adjusting emission characteristics.

For example, if the present invention is applied to a display having a large screen, it may be demanded that a center portion of the screen shows an emission directivity adjusted separately from that of a periphery portion of the screen under considering characteristics of human sense of sight. In such a case, the light guide plate has preferably has ridge-like projections provided by grooves like concentric circles with a center located in the center portion.

If a point like light emitter such as LED is employed as a primary light source, it may be adopted to form ridge-like projections as to have grooves extend radially from the point-like light emitter.

(b) In the first embodiment, radius R is set as to be by far greater than pitch P. However, this puts no limitation on the present invention. A value of R/P may be greater than that in the case of example adopted in the first embodiment. A ridge-like projection having a cross section other than arc-like one, for instance like V-shaped one, may be employed.

(c) In the second embodiment, the dome-like or granulated fine-unevenness surface is formed irregularly, but this puts no limitation on the present invention. Any technique may be applied to manufacture a fine-unevenness surface and applicable techniques are various. They include mat processing, etching applied to a mold, electric discharge machining and so forth for making a rough surface.

(d) A micro-reflector may have a shape other than one employed in the above embodiments. Shapes other than quadrangle pyramid may be adopted. A micro-reflector is essentially employable so far as it is able to provide a generally frontal emission through a direction-conversion of an illumination light by means of a pair of slopes effecting mainly double reflections. It is, however, should be avoided to employ a shape such that the illumination light is blocked at an input side.

(e) A pair of slopes of each micro-reflector need not always to be connected directly to each other. A pair of slopes may be connected to each other with a curved face interposed between them so far as a practically enough performance is realized. Alternatively, a pair of slopes themselves may consist of curved surfaces.

In these cases, as viewed from the emission face side, top lines of the curved surfaces forms ridges, and micro-reflectors are orientated so that the ridges extend in a direction generally perpendicular to an incidence face.

(f) Covering rate of micro-reflectors may be adjusted as required. And this adjustment may be performed through adjusting number density or size of micro reflectors. Both may be applied in combination at the same time.

(g) In each of the above embodiments, an incidence face it provided by one side face of a light guide plate, but this puts no limitation on the present invention. For example, a point-like light emitter employed as a primary source may be disposed on or near to an incidence face set at a corner of a light guide plate.

(h) The above-described embodiments employ light guide plates each of which has a generally uniform thickness, this puts no limitation on the present invention. However, this puts no limitation on the present invention. For example, an employable light guide plate has a wedge-like cross section.

(i) The above embodiments are described as they are applied to displays for portable phones. However, this puts no limitation, and the present invention may be applied to various appliances which require a surface-like illumination.

What is claimed is:

1. A light guide plate comprising:
    an emission face provided by a major face;
    a back face opposite to said emission face; and
    an incidence face to introduce light,
    wherein said back face is provided with a great number of projection-like micro-reflectors and a fine-unevenness surface formed among said micro-reflectors, each of said micro-reflectors having a pair of slopes which meet each other to form a ridge that gets closer with an increasing distance from said incidence face, thereby causing said micro-reflectors to urge the emission face to emit light toward a specific direction,
    said fine-unevenness surface functioning to urge the emission face to emit the light toward various directions.

2. A light guide plate in accordance with claim 1, wherein said micro-reflectors are shaped like quadrangle pyramids.

3. A surface light source device comprising:

a light guide plate having an emission face provided by a major face, a back face opposite to said emission face and an incidence face to introduce light; and a primary light source to supply light to said incidence face, wherein said back face is provided with a great number of projection-like micro-reflectors and a light fine-unevenness surface formed among said micro-reflectors, each of said micro-reflectors having a pair of slopes which meet each other to form a ridge that gets closer with an increasing distance from said incidence face, thereby causing said micro-reflectors to urge the emission face to emit the light toward a specific direction, said light fine-unevenness surface to urge the emission face to emit light toward various directions.

4. A surface light source device in accordance with claim 3, wherein said micro-reflectors are shaped like quadrangle pyramids.

5. A display including a liquid crystal display panel and a surface light source device to illuminate said liquid crystal display panel, said surface light source device comprising:

a light guide plate having an emission face provided by a major face, a back face opposite to said emission face and an incidence facet to introduce light; and a primary light source to supply light to said incidence face, wherein said back face is provided with a great number of projection-like micro-reflectors and a fine-unevenness surface formed among said micro-reflectors, each of said micro-reflectors having at least a pair of slopes which meet each other to form a ridge that gets closer with an increasing distance from said incidence face, thereby causing said micro-reflectors to urge the emission face to emit the light toward a specific direction, said fine-unevenness surface to urge the emission face to emit the light toward various directions.

6. A display in accordance with claim 5, wherein said micro-reflectors are shaped like quadrangle pyramids.

* * * * *